5 Sheets--Sheet 1.

A. H. WAGNER.
Sewing-Machine.

No. 132,124.

Patented Oct. 8, 1872.

Witnesses.
C. N. Poole.
John R. Young.

Inventor
A. H. Wagner, by
Prindle and Co. his Attys

5 Sheets--Sheet 2.

A. H. WAGNER.

Sewing-Machine.

No. 132,124. Patented Oct. 8, 1872.

Witnesses.
C. H. Poole.
John R. Young

Inventor
A. H. Wagner by
Prindle and Co., his Attys

A. H. WAGNER.

Sewing-Machine.

No. 132,124. Patented Oct. 8, 1872.

5 Sheets--Sheet 3.

Witnesses,
C. H. Poole
John R. Young

Inventor,
A. H. Wagner, by
Prindle and Co., his Atty.

A. H. WAGNER.
Sewing-Machine.

No. 132,124.  
Patented Oct. 8, 1872.

5 Sheets--Sheet 4.

A. H. WAGNER.

Sewing-Machine.

No. 132,124.

5 Sheets--Sheet 5.

Patented Oct. 8, 1872.

Witnesses,
H. Poole.
John R. Young

Inventor,
A. H. Wagner, by
Prindle & Co., his Attys

UNITED STATES PATENT OFFICE.

AUSBERT H. WAGNER, OF CHICAGO, ILLINOIS.

IMPROVEMENT IN SEWING-MACHINES.

Specification forming part of Letters Patent No. 132,124, dated October 8, 1872.

*To all whom it may concern:*

Be it known that I, AUSBERT H. WAGNER, of Chicago, in the county of Cook, and in the State of Illinois, have invented certain new and useful Improvements in Sewing-Machines; and do hereby declare that the following is a full, clear, and exact description thereof, reference being had to the accompanying drawing making a part of this specification, in which—

Figure 1:
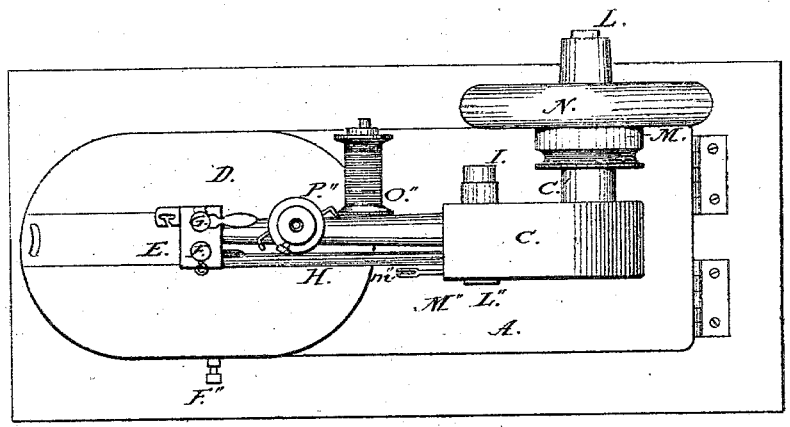
Figure 2:
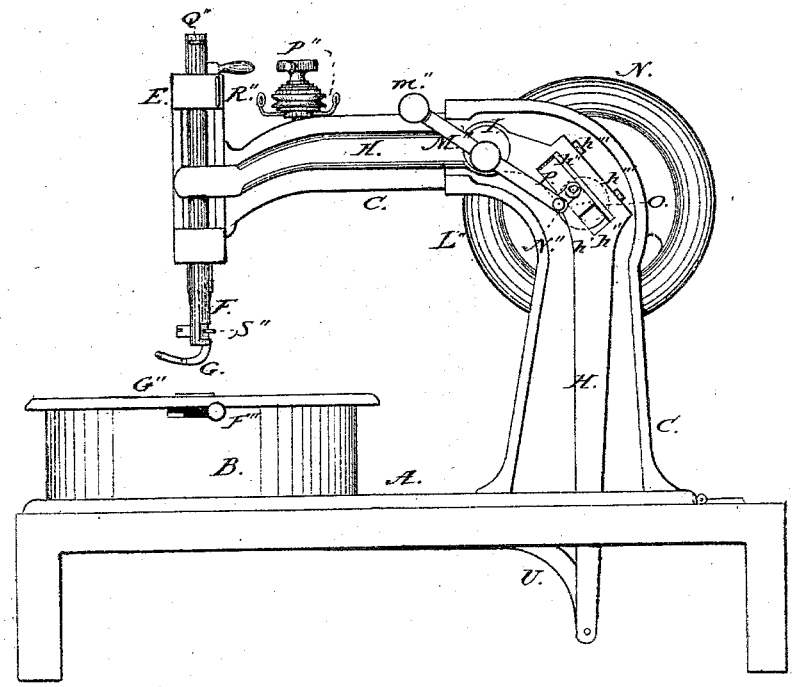
Figure 3:
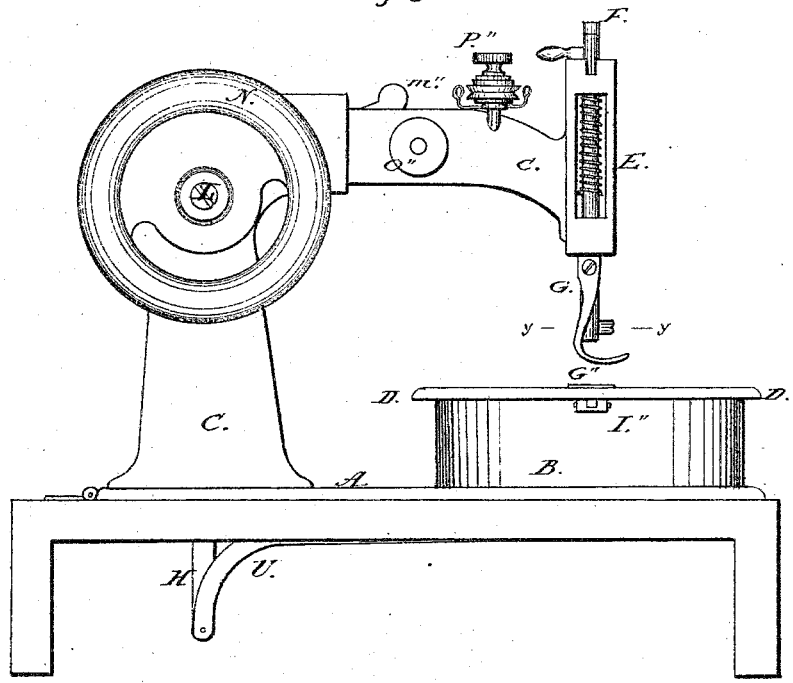
Figure 7:
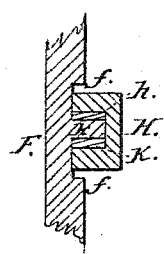
Figure 6:
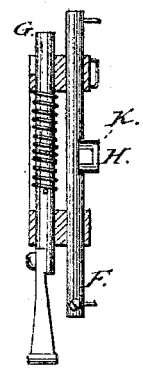
Figure 8:
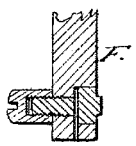
Figure 4:
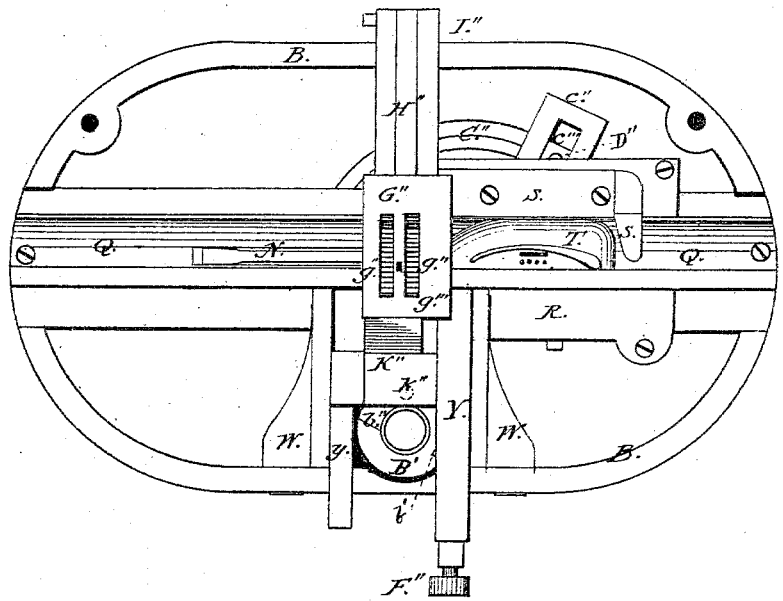
Figure 5:
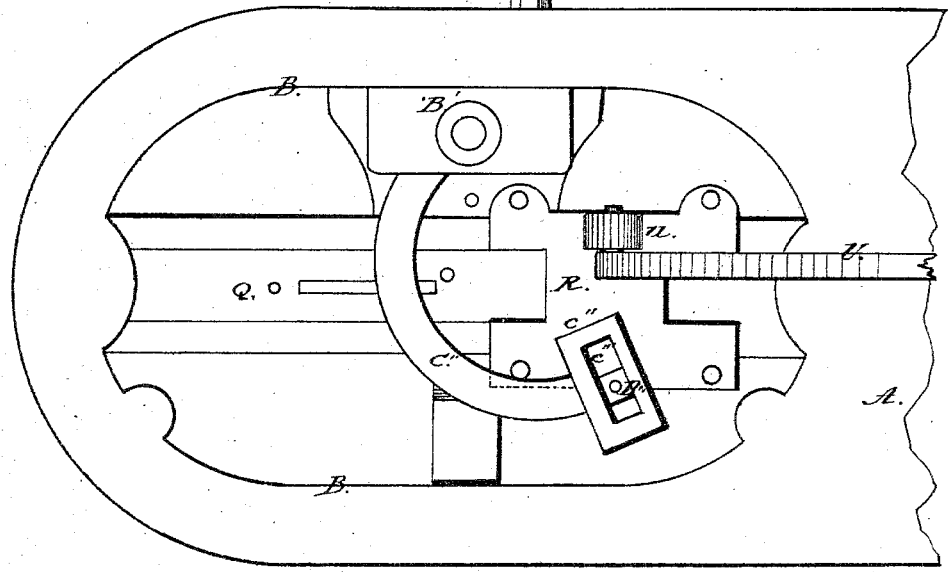
Figure 9:
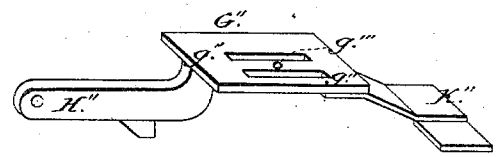
Figure 10:
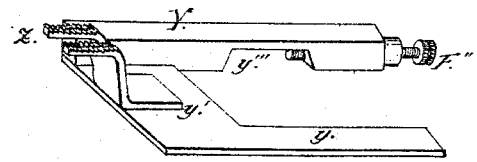
Figure 11:
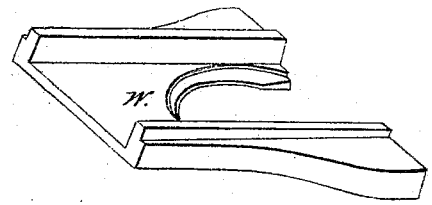
Figure 12:
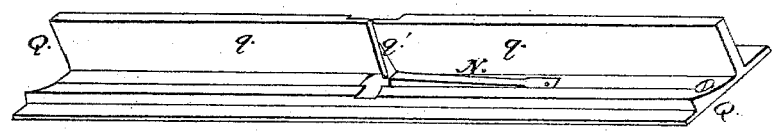
Figure 13:
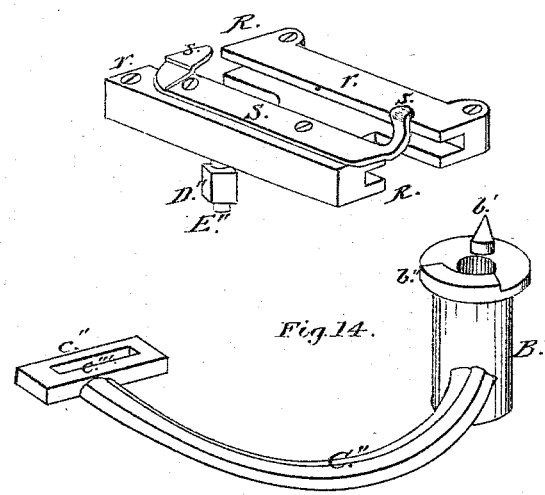
Figure 14:
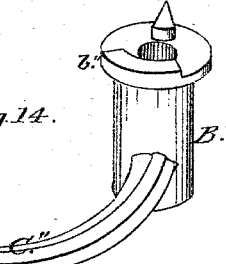
Figure 15:
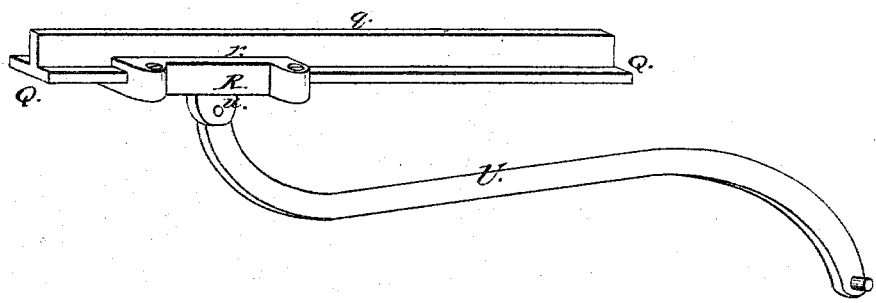

Figure 1 is a plan view of the upper side of my machine; Figs. 2 and 3 are elevations of opposite sides of the same; Fig. 4 is a plan view of the upper side of the operative mechanism, situated beneath the cloth-plate, said plate being removed; Fig. 5 is a like view of the lower side of said mechanism; Fig. 6 is a front elevation of the presser and needle-bars, with the front portion of their housing removed; Fig. 7 is a vertical central section of the needle-bar, upon a line extending from side to side at its point of attachment, to or with the vibrating arm; Fig. 8 is a like view of the lower end of said needle-bar; Fig. 9 is a perspective view of the needle-plate detached and enlarged; Figs. 10 and 11 are, respectively, perspective views of the feed-bar and the race or way for the same; Figs. 12 and 13 are, respectively, perspective views of the shuttle-race and shuttle-carrier; Fig. 14 is a like view of the curved arm and cam-sleeve, used for operating the feed; and Fig. 15 is a perspective view of the shuttle race and carrier and operating connection.

Letters of like name and kind refer to like parts in each of the figures.

My invention consists principally in the means employed for operating the feed-bar and needle-plate, substantially as and for the purpose hereinafter shown. It consists, further, in the employment of a spring-catch or detent upon or within the lower side of the shuttle-race and in front of the needle-way, for the purpose of holding in place the loop while the shuttle passes through the same, substantially as is hereinafter shown and described. It consists, further, in the peculiar construction and combination of the "take-up," and its operating mechanism, substantially as and for the purpose hereinafter set forth.

In the annexed drawing, A represents the base of the frame, provided at and in rear of its forward end with a housing, B, for containing the shuttle and feed works, and at its rear end with an arm, C, which extends upward and then forward, so as to bring its end directly over the center of the plate D, which forms a covering for said housing B. Upon the end of the arm C is a housing or box, E, open at its sides, which contains a needle-bar, F, and presser-bar, G, of usual construction. From its lower end upward and forward, to a point about midway between its vertical portion and the housing E, the arm C is made hollow, and contains an arm, H, which corresponds in general shape longitudinally to the shape of said arm C, and is pivoted to or upon the latter at a point, I, in front of its vertical portion. The forward end of the vibrating arm H is provided with a longitudinal groove, $h$, upon or within its face adjacent to the needle-bar F, while within said bar is cut a notch, $f$, that corresponds to and receives said arm. A block, K, corresponding in general size and shape to the groove $h$, is placed within the same, and is pivoted at its longitudinal center to or upon the needle-bar, in which position, as said vibrating arm moves up or down, said block moves longitudinally within its groove, and at the same time turns upon its pivotal screw $k$, so as to conform to the inclination of said groove, while at the same time a vertically-reciprocating motion will be imparted to said needle-bar. Motion is imparted to the vibrating arm through a shaft, L, which is journaled within a suitable bearing, C', attached to and extending horizontally outward from the frame-arm C, at or near the upper end of its vertical portion. The outer end of the shaft L is provided with a driving-pulley, M, and balance-wheel N, while upon its inner end is affixed a circular metal disk or plate, O, from near the edge of which extends horizontally outward a pin or stud, $o$. A block, P, corresponding to and sliding within a slot, $h'$, formed within the vibrating arm H, is provided with a central opening that receives and contains the pin $o$, and connects said block to or with the shaft L. If, now, the shaft be rotated, the eccentric motion of the pin $o$ will be communicated to the block P, and through the same to the vibrating arm H, so as to cause the latter to oscillate upon its bearing, said block during such operating being moved longitudinally within its slot to a distance equal to the throw of said pin $o$. In order that the wear of the contiguous faces of the block and slot may be compensated for so as to prevent "lost motion," a plate, $h''$, is fitted within and forms one of the bearing-surfaces for said slot. Two set-screws, $h'''$, passing through the side of the arm H, with their inner ends bearing against the outer side of the plate $h''$, enable the latter to be pressed inward so as to lessen the available width of the slot, and cause the same to correspond to the like dimensions of the block. A shuttle-race, Q, having the general form shown in Fig. 12, is placed within the housing B, said race extending longitudinally through the center of said housing, with its vertical rib or flange $q$ slightly above the upper edge of the same. The shuttle-carrier R, having the form shown in Fig. 13, is placed upon the lower side of the race Q, and caused to embrace the parallel edges of the same by means of adjustable gibs or jaws $r$, which are placed upon the upper side of the edge of said race, and, projecting over the same, are suitably attached to the corresponding portions of said carrier. A plate, S, provided with two lateral and upward-projecting arms, $s$, is secured upon the upper side of the carrier, opposite to the vertical flange $q$, with said arms extending in rear and front of the shuttle T, so as to loosely confine the latter in longitudinal position with relation to its carrier, and cause the latter to impart its motion to said shuttle. A reciprocating motion is given to the carrier R by means of a connection, U, which is pivoted at one end to or within a lug, $u$, that extends downward from the lower side of the former, and at its opposite end to or with the lower end of the vibrating arm H. Within the lower inner side of the shuttle-race, and immediately in front of the needle-way $q'$, is placed a spring, N, which is so secured at its forward end as to leave its rear end free to spring downward into a corresponding recess formed within said race. The object of this spring is to hold the thread in place and prevent it from being carried forward by the shuttle as it passes through the loop.

The feed is produced by means of the following-described devices: Secured within the housing B is a race or way, W, which has the forms shown in Fig. 11, and extends from the vertical portion of the shuttle-race laterally outward to the side of said housing, a portion of which is removed upon a line corresponding to the interior of said race. Within the race or way thus formed is placed a frame composed of a square and a rectangular bar, Y and $y$, respectively, placed parallel to each other and connected together at their inner ends by means of a cross-bar or plate, $y'$, the whole having such horizontal dimensions as to cause it to loosely fill said race in a line with the motion of the shuttle, while in an opposite direction said frame is free to move within its bearing. From the longitudinal center of the cross-bar $y'$ extends upward and then horizontally forward a dog, Z, the upper portion of which, coming slightly above the cloth-plate, is bifurcated so as to pass upon either side of the needle-way $q'$, and is provided with suitable serrations or teeth which rake forward in the usual manner. Journaled upon a vertical stud which extends downward through an opening in the feed-bar race is a sleeve, B', from one side of which, near its lower end, extends outward and across a curved arm, C'', the end of which arm is provided with a slotted plate, $c''$, that is placed at a right angle therewith. A block, D'', corresponding in width to the slot $c'''$, is pivoted upon a stud that projects downward from the shuttle-carrier R, and, fitting into said slot, causes the reciprocating motion of said carrier to be communicated through the arm C'' to the sleeve B', and give to the latter a semi-rotary motion upon its bearing. A stud, $b'$, having the form shown in Fig. 14, projects upward from the upper enlarged end of the sleeve B' into a notch, $y'''$, formed within the lower side of the feed-bar Y, and, engaging with the ends of said notch, imparts to said bar a reciprocating movement in a straight line, as said sleeve rotates in opposite directions upon or around its pin. As the degree of movement of the feed-bar depends upon the motion allowed to the stud $b'$, before it impinges against the ends of the slot, it will be seen that by increasing or diminishing the length of said slot the motion of said bar will be correspondingly diminished or increased. This adjustment is effected by means of a screw, F'', which passes inward through the end of the feed-bar Y into the notch $y'''$. By turning said screw inward the effective length of the slot is diminished and the movement of the feed-bar increased, while by withdrawing said screw a contrary effect is produced. As the feed-bar moves only in a horizontal plane it is necessary that the cloth should be raised and released from the dog when the latter moves backward. To accomplish the result a rectangular opening is made in the cloth-plate immediately beneath the needle, and a plate, G'', corresponding in size and shape thereto, is fitted to the said opening and provided with suitable slots or openings $g''$ for the reception of the feed-dog, and with a circular central opening $g'''$ for the passage of the needle. From the forward end and lower side of the needle-plate G'' an arm or bar, H'', extends horizontally outward to a point slightly beyond the wall of the housing B, and at its outer end is pivoted within a bearing, I'', secured to or upon said housing, by which arrangement said needle-plate is secured in horizontal position, while free to move vertically within certain limits. From the opposite or rear end of the needle-plate G'' an arm, K'', extends outward and downward and rests upon a raised portion, $b''$, of the end of the sleeve B', the end of which raised part toward the stud $b'$ has a downward and forward inclination. A pin, $k''$, extends downward from the lower side of the arm $K''$ between the raised part $b''$ and stud $b'$ of the sleeve, which pin is raised by the sloping end of the part $b''$ as the sleeve $B'$ rotates. When thus arranged it will be seen that as the feed-bar moves forward the needle-plate falls, so as to cause the feed-dog to project above the same and engage with the fabric being operated upon, while, upon the return of said feed-dog, said needle-plate is raised so as to bring its upper surface above the serrated face of said dog and remove the same from contact with the cloth, by which means the necessary intermittent motion in one direction is imparted to the latter.

In order that the surplus thread which forms the loop may be drawn taut after the passage of the shuttle the following-described means are employed: Journaled within and extending horizontally outward from the end of the bearing of the vibrating arm is a stud, I, within the enlarged end of which is provided a slot that receives and contains a rectangular bar, $M''$, the size of said slot being such as to permit said bar to slide freely through the same. The rear end of the bar $M''$ is pivoted to or upon the outer end of a crank, $N''$, which is secured to and revolves with the pin $o$, while within the front end of said bar is pivoted a small grooved wheel or pulley, $m''$. The thread passes from the spool $O''$ around the tension $P''$ downward through an eye, $Q''$, attached to the upper end of the needle-bar; thence through an eye, $R''$, attached to the upper end of the needle-bar housing; thence rearward around the pulley $m''$ of the "take-up" bar; thence forward and again through said eye $R''$; and thence downward through an eye, $S''$, attached to the lower end of said needle-bar. The position of the crank $N''$ being properly adjusted, the take-up bar is thrown forward and its outer end downward as the needle descends, immediately after which the outer end of said bar rises and is drawn rearward, so as to draw taut upon the thread at the instant that the shuttle has passed through its loop. By changing the radial position of the crank $N''$ the action of the "take-up" can be advanced or retarded with relation to the motion of the needle-bar and shuttle, the necessary adjustment being effected with ease and certainty.

Having thus fully set forth the nature and merits of my invention, what I claim as new is—

1. In combination with the feed-bar Y provided with the notch $y'''$, the sleeve $B'$ provided with the stud $b'$ and operated by means of the arm $C''$, the block $D''$, and the stud $E''$, substantially as and for the purpose shown.

2. In combination with the needle-plate $G''$, constructed as shown and provided with the stud $k''$, the sleeve $B'$ provided with the raised sloping part $b''$, and operated by means of the curved arm $C''$, the block $D''$, and the stud $E''$, substantially as and for the purpose set forth.

3. The spring-catch or detent N, constructed as shown, and combined with the shuttle-race Q and needle-way $q'$, and acting to prevent the thread from being carried forward by the shuttle, substantially as described.

4. The "take-up" shown, consisting of the bar $M''$ provided with the pulley $m''$ contained within the slotted stud I, and operated by means of the crank $N''$ attached to and revolving with the pin $o$, substantially as and for the purpose set forth.

In testimony that I claim the foregoing I have hereunto set my hand this 17th day of May, 1872.

AUSBERT H. WAGNER.

Witnesses:
C. J. CORSE,
THOS. B. JEFFERY.